Patented Dec. 14, 1948

2,456,590

UNITED STATES PATENT OFFICE 2,456,590

4-AMINO-4-METHYLVALEROALKYLAMIDES AND METHOD FOR PREPARING THEM

Glen H. Morey, Terre Haute, Ind., assignor to Commercial Solvents Corporation, Terre Haute, Ind., a corporation of Maryland No Drawing. Application December 26, 1947, Serial No. 794,133

9 Claims. (Cl. 260—561)

This invention relates to new and useful 4-amino-4-methylvaleroalkylamides and to a method for preparing them. More particularly it relates to such amides having the following general formula

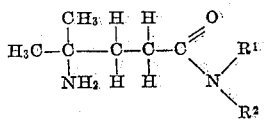

wherein $R^1$ may be hydrogen or an alkyl group, and $R^2$ is an alkyl group.

Among the compounds included in the above formula there may be mentioned 4-amino-4-methyl-valerodimethyl-amide; 4-amino-4-methyl-valerodiethylamide; 4-amino-4-methyl-valeroethylpropylamide; 4-amino-4-methyl-valeroethylamide; 4-amino-4-methyl-valerodibutylamide; 4-amino-4-methyl-valerooctylamide; 4-amino-4-methyl-valerooctadecylamide; 4-amino-4-methyl-valerodihexadecylamide; 4-amino-4-methyl-valeroheptadecylamide and the like.

I have found that the new compounds of my invention may be prepared in accordance with the process hereinafter described wherein 4-nitro-4-methylvaleric acid or an acyl halide thereof is caused to react with a primary or secondary alkylamine, and then the resulting 4-nitro-4-methyl-valeroalkylamide is catalytically reduced to the amino compound.

The 4-nitro-4-methylvaleric acid used in my invention may be obtained by reacting acrylonitrile with 2-nitropropane to produce 4-nitro-4-methylvaleronitrile which in turn is converted by alkaline hydrolysis of the nitrile group into the corresponding nitro acid. The first step of the operation was accomplished by mixing 10 mols of 2-nitropropane with 700 cc. of dioxane and 35 cc. of a 40% solution of trimethylbenzylammonium hydroxide and after warming the resulting solution to 35° C., adding thereto 11 mols of acrylonitrile portionwise. Five or 10 cc. portions of the trimethylbenzylammonium hydroxide were added from time to time until a total of 90 cc. was added. After the reaction was completed 50 cc. of conc. HCl was added and the dioxane removed by distillation after washing the product with water. The product was further washed with chloroform and the latter removed by distillation, giving a 90.4% yield of 4-nitro-4-methylvaleronitrile which was then refluxed for 3 hours with aqueous potassium hydroxide and evaporated to one half its volume to remove the ammonia formed during the refluxing. The reaction product was next neutralized with hydrochloric acid. The resulting oil layer was collected and combined with the chloroform extract of the aqueous layer and the chloroform removed by distillation and the 4-nitro-4-methylvaleric acid recovered from the resulting solution by crystallization. By treating the latter with phosphorous trichloride and removing the excess reactants the acid chloride was obtained.

In carrying out my claimed invention, I mix 4-nitro-4-methylvaleric acid or an acyl halide thereof with the appropriate primary or secondary aliphatic amine directly or preferably in the presence of an inert liquid such as an aliphatic hydrocarbon, an aromatic hydrocarbon or the like, while stirring the mixture.

Either the acid or its acyl halide may be used in carrying out the reaction with both primary and secondary amines. However, I have found that in the case of secondary amines higher yields are obtained if the acyl halide is used rather than the acid as the starting reactant. In the case of the primary amines, equally good yields are obtained with both procedures. Therefore, where the term 4-nitro-4-methylvaleric acid is referred to in the claims it should be considered as equivalent to and inclusive of the acyl halide of this material.

If the acyl halide is used as one of the starting reactants, for example, in connection with reactions with secondary amines, a sufficient quantity of aliphatic amine is preferably added both to replace the halogen of the acyl halide, and also to react with and remove the halogen atom, that is, about 2 moles of the amine to 1 mole of the acid halide should be employed. The aliphatic amine hydrochloride may then conveniently be removed from the mixture after reaction, for example, by filtration. The inert liquid and the water of reaction—if the acid has been used—may be removed after reaction by known methods such as by azeotropic distillation.

The 4-nitro-4-methylvaleroalkylamides thus prepared is then subjected to catalytic hydrogenation in a liquid medium to reduce the nitro group to an amino group. In carrying out the hydrogenation, I place the 4-nitro-4-methylvaleroalkylamide in a pressure vessel along with an inert liquid such as a lower aliphatic alcohol and an appropriate catalyst, for example, Raney nickel, palladium charcoal, colloidal platinum, and the like. The vessel is closed and hydrogen is led in under superatmospheric pressure—pressures of 1,000 lbs./sq. in. or less usually being sufficient. The temperature may be mildly elevated to promote reaction and in general need not be in excess of about 150° C. for good results. When hydrogen absorption ceases, the vessel is opened, catalyst and inert liquid removed, and the 4-amino-4-methylvaleroalkylamide is recovered, for example, by distillation under reduced pressure.

The compounds of my invention are usually high boiling oily liquids, even some of the higher alkyl derivatives, although many of the corresponding higher nitro derivatives are waxy solids.

The new amides of my invention are useful in the synthesis of various pharmaceutical compounds and in the preparation of cation-active softeners.

The following specific examples will further illustrate my invention.

*Example I*

A mixture was prepared of 258 parts of dibutylamine and 500 parts of benzene in a reaction vessel. Another mixture of 123 parts of 4-nitro-4-methylvaleryl chloride and 300 parts of benzene was prepared and added dropwise while stirring to the first mixture. A large quantity of dibutylamine hydrochloride crystals appeared. The mixture was heated, and the crystals removed by filtering while hot. The benzene was removed by distillation at atmospheric pressure and the excess dibutylamine removed by distillation under reduced pressure. The residue of 4-nitro-4-methylvalerodibutylamide amounted to 170 parts corresponding to a yield of 89.6%. Of this material 146 parts were mixed with 400 parts of methanol and 20 parts of Raney nickel catalyst in a pressure vessel and hydrogen was passed in at a pressure of about 1,000 pounds per square inch, and a temperature up to 125° C., until hydrogen absorption ceased. After hydrogenation the charge was filtered to remove catalyst, and distilled to remove methanol. The product, 4-amino-4-methylvalerodibutylamide was distilled at about 1 mm. pressure and amounted to 115 parts, a yield of 89.4% on the nitro compound. Nitrogen analysis showed 11.4% nitrogen as compared to 11.66% theoretical value.

*Example II*

A mixture of 80.5 parts of 4-nitro-4-methylvaleric acid, 64.5 parts of normal octylamine and 200 parts of xylene was placed in a reaction vessel fitted with a head for removing water as a lower layer from the distillate while continuously returning the xylene to the flask. The mixture was refluxed for 24 hours to remove water of reaction. The xylene was then distilled off leaving 126 parts of a deep red oil, the 4-nitro-4-methylvalerooctylamide. Of this material 117 parts was mixed with 400 parts of methanol and 15 parts of Raney nickel catalyst in a pressure vessel. The vessel was closed and hydrogen was led in at 1,000 pounds pressure, up to a temperature of 130° C. After hydrogen absorption ceased the vessel was opened, the catalyst removed by filtration, the methanol removed by distillation leaving 47 parts of a yellow oil, the 4-amino-4-methylvalerooctylamide, corresponding to a yield of 45.2% on the nitro compound. The nitrogen analysis showed 11.55% nitrogen present as compared to 11.57%, theoretical value.

*Example III*

A mixture was prepared of 150 parts of ethylamine and 400 parts of benzene and cooled to 10° C. Then 107 parts of 4-nitro-4-methylvaleryl chloride was added dropwise while stirring. After reaction, the excess ethylamine and benzene were distilled off. The remaining 4-nitro-4-methylvaleroethylamide was a clear red oil amounting to 90 parts, corresponding to a yield of 80.4%. Of this material 87 parts were mixed with 400 parts of methanol in a pressure vessel and hydrogenated at 1,000 lbs./sq. in. at temperatures up to 130° C. The product was filtered free of catalyst and the methanol distilled off, whereupon there was obtained 60 parts of 4-amino-4-methylvaleroethylamide, a light yellow oil, corresponding to a yield of 82% based on the nitro compound. Nitrogen analysis showed 16.45% nitrogen as compared to a theoretical value of 17.72%.

*Example IV*

A mixture of 134.5 parts of stearylamine, 80.5 parts of 4-nitro-4-methylvaleric acid, and 300 parts of xylene were placed in a reaction vessel fitted with a head for removing water as a lower layer from the distillate while returning the xylene to the reaction vessel. The solution was heated until 9 parts of water were given off. The xylene was then removed by distillation at reduced pressure from a steam bath. The product was of a dark color. It was recrystallized from hexane to remove color. Yield 165 parts corresponding to 80.5%. Nitrogen found, 7.11%. Theory for 4-nitro-4-methylvalerooctadecylamide, N 6.80%. The entire amount of product was dissolved in 1400 parts of methanol and hydrogenated at 1000 lbs. per sq. in. using 10 parts of Raney nickel catalyst. After hydrogenation the catalyst was filtered out, and the methanol distilled from the product. 160 parts of this product was neutralized with hydrochloric acid to form the hydrochloride and diluted with sufficient water to form an aqueous paste containing 40% by weight of solids which had the properties of an effective cation active softener.

*Example V*

The 4-nitro-4-methylvaleryl chloride was reacted with diethylamine in benzene solution as described in Examples I and III and resulted in a 91.6% yield of 4-nitro-4-methylvalerodiethylamide. This product was catalytically hydrogenated as described above to the 4-amino-4-methylvalerodiethylamide.

While the above describes the preferred embodiments of my invention, it will be understood that departures may be made therefrom within the scope of the specification and claims.

This is a continuation-in-part of my U. S. Serial Number 581,710, filed March 8, 1945, which is now abandoned.

What is claimed is:

1. As new compositions of matter 4-amino-4-methylvaleroalkylamides having the following general formula

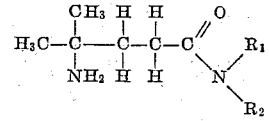

wherein $R^1$ is a member selected from the group consisting of hydrogen and alkyl radicals, and $R^2$ is an alkyl radical.

2. 4-amino-4-methylvalerooctadecylamide.
3. 4-amino-4-methylvalerooctylamide.
4. 4-amino-4-methylvalerodibutylamide.
5. In a method for preparing 4-amino-4-methyl-valeroalkylamides, the steps which comprise reacting 4-nitro-4-methylvaleric acid with an alkylamine selected from the group consisting of primary alkylamines and secondary alkylamines, and thereafter catalytically hydrogenating the reaction product.

6. In a method for preparing 4-amino-4-methyl-valeromonoalkylamides, the steps which comprise reacting 4-nitro-4-methylvaleric acid with a primary alkylamine, and thereafter catalytically hydrogenating the reaction product.

7. In a method for preparing 4-amino-4-methyl-valerodialkylamides, the steps which comprise reacting 4-nitro-4-methylvaleric acid with a secondary alkylamine, and thereafter catalytically hydrogenating the reaction product.

8. In the preparation of 4-amino-4-methyl-valeroalkylamines, the process which comprises reacting a compound, selected from a group consisting of 4-nitro-4-methylvaleric acid and the acid halides thereof, with an amine selected from a class consisting of primary and secondary alkyl amines, and thereafter catalytically hydrogenating the reaction product.

9. In the preparation of 4-amino-4-methyl-valeroalkylamides, the process which comprises reacting an acid halide of 4-nitro-4-methylvaleric acid with an amine, selected from a class consisting of primary and secondary alkyl amines, in the molecular proportions of about 1 to 2, separating the resulting alkylamine hydrohalide from the reaction mixture and thereafter catalytically hydrogenating the remaining 4-nitro-4-methylvaleroalkylamide.

GLEN H. MOREY.

No references cited.